United States Patent [19]

Al Mouhamed et al.

[11] Patent Number: 4,566,845

[45] Date of Patent: Jan. 28, 1986

[54] MEASURED-FORCE GRIPPER DEVICE OF ARTICULATED STRUCTURE HAVING SEVERAL DEGREES OF FREEDOM

[75] Inventors: Mayez Al Mouhamed, Talkhalakh, Syria; Etienne Csakvary, Maurepas, France; Bertrand De Cosnac, Paris, France; Jean-Paul Noel, Chatenay Malabry, France

[73] Assignee: Commissariat a l'Energie Atomique, Paris, France

[21] Appl. No.: 457,488

[22] Filed: Jan. 12, 1983

[30] Foreign Application Priority Data

Jan. 28, 1982 [FR] France ................ 82 01326

[51] Int. Cl.[4] ............................. B66C 1/00
[52] U.S. Cl. .................... 414/735; 73/862.04; 901/34
[58] Field of Search ............... 414/735; 901/33, 34, 901/35, 46; 73/862.04, 862.54, 862.64; 294/86 R

[56] References Cited

U.S. PATENT DOCUMENTS

| 3,875,481 | 4/1975 | Miller et al. | 73/862.64 X |
| 3,921,445 | 11/1975 | Hill et al. | 73/133 R |
| 3,948,093 | 4/1976 | Folchi et al. | 901/34 X |
| 4,132,318 | 1/1979 | Wang et al. | 901/34 X |

FOREIGN PATENT DOCUMENTS

| 2636473 | 2/1978 | Fed. Rep. of Germany . |
| 2375962 | 7/1978 | France . |
| 2416094 | 8/1979 | France . |
| 47801 | 1/1978 | Japan .................. 901/33 |

OTHER PUBLICATIONS

"Two-Dimensional Compliant Device for Robot Sensor", IBM Technical Disclosure Bulletin, vol. 24, No. 4, Sep. 1981.

Primary Examiner—Robert J. Spar
Assistant Examiner—Donald W. Underwood
Attorney, Agent, or Firm—Oblon, Fisher, Spivak, McClelland & Maier

[57] ABSTRACT

A measured-force gripper device of articulated structure having several degrees of freedom and interposed between the contact plate and its support, the device comprising two fingers which can be displaced to grasp an article to be handled, each finger being formed by a support, a contact plate which contacts the article to be handled, an articulated structure, which has several degrees of freedom and is interposed between the contact plate and the support, and a displacement-measuring pickup associated with each of the degrees of freedom of each finger, the pickup delivering information related exclusively to the movements carried out in accordance with that degree of freedom.

8 Claims, 7 Drawing Figures

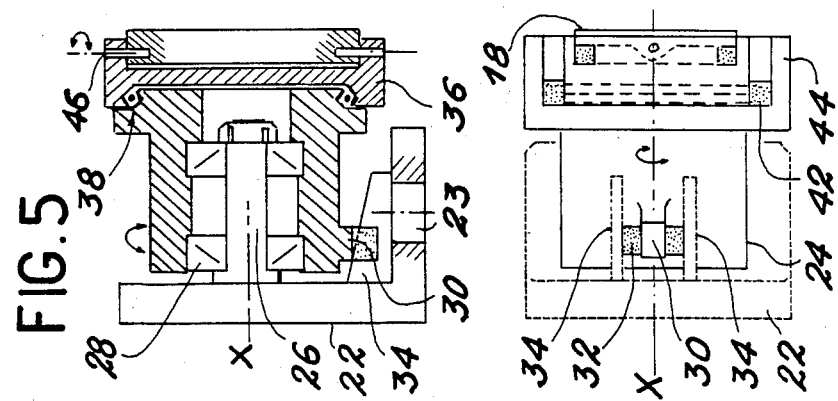
FIG.5
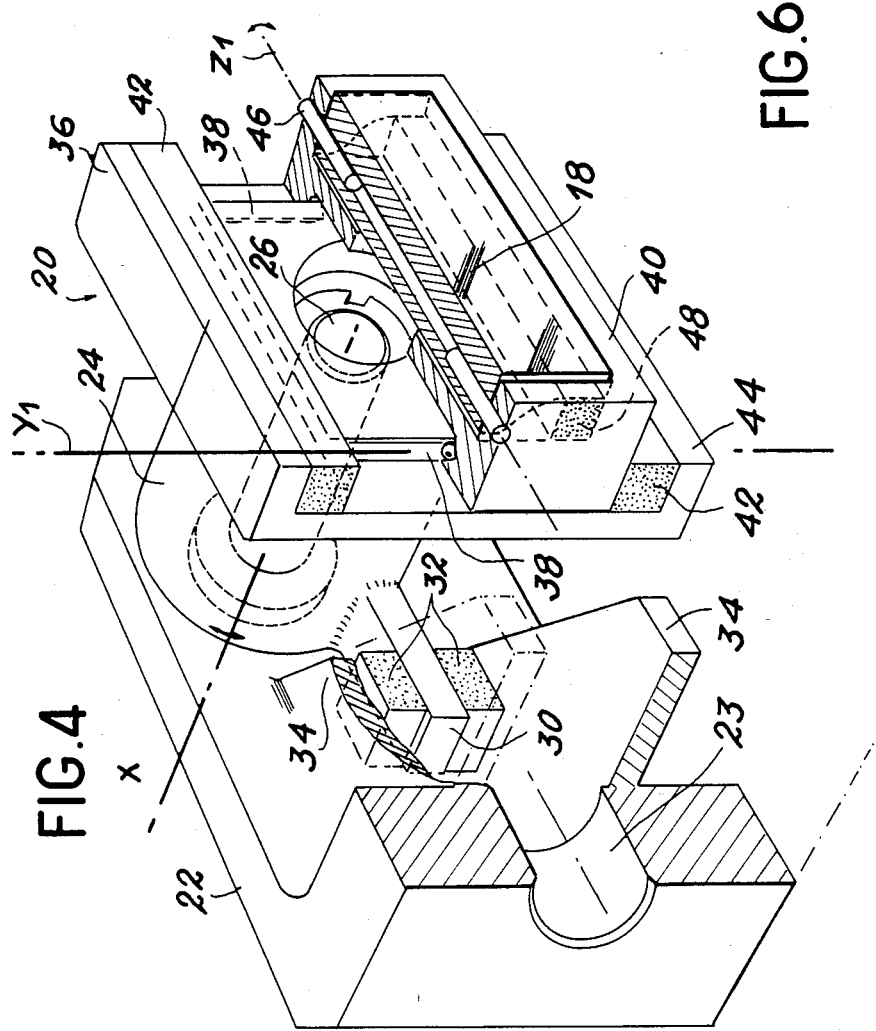
FIG.4
FIG.6

MEASURED-FORCE GRIPPER DEVICE OF ARTICULATED STRUCTURE HAVING SEVERAL DEGREES OF FREEDOM

BACKGROUND OF THE INVENTION

1. Field of the Invention:

The invention discloses a measured-force gripper device of articulated structure interposed between the contact plate and its support.

2. Description of the Prior Art:

Manipulators are mechanical devices which replace human hands to perform certain operations.

Manipulators are used, for example, to protect an operator against a radioactive atmosphere contained in an enclosure. The manipulations of the operator on a master manipulator disposed outside the enclosure, behind a protected wall, are reproduced by the manipulator disposed inside the enclosure.

Another application of manipulators is to take the place of labor, for example, for repetitive operations.

However, in all applications the precision which can be obtained at the end of the manipulator is limited on the one hand by the imperfections of its mechanical construction, and on the other hand by the capacities of the operator him or herself, when a master manipulator is controlled by an operator.

For example, to introduce a pin into a bore, it must be moved precisely into the axis of the bore. If this condition is not met, there is a risk of spoiling the wall of the bore or the pin which is to be introduced. However, as has been recalled, the precision of a manipulator is not adequate to obtain satisfactory alignment of the member to be inserted with the bore.

To get over this difficulty, measured-force gripper devices have been constructed. Such devices enable the forces exerted on the article which is handled to be measured and compared with a desired value predetermined as a function of the operation to be performed, and the position of the manipulator to be corrected in relation to the difference between the force measured and the required value. For example, in the case already mentioned of the insertion of a pin into a bore, there must be a zero force along two axes perpendicular to the axis of the bore. The force along the axis of the bore is not zero, but it must remain lower than a predetermined value in relation to various parameters, such as the surface state of the bore or the pin, or the clamping of the two members. The manipulator bearing the member to be inserted is therefore repositioned until the force measured in two directions perpendicular to the axis of the bore is zero and the force along such axis less than the required value. From that moment onwards the insertion operation is pursued. If at any moment one of the forces should exceed the required value, insertion would stop. The manipulator would be repositioned, and so on and so forth.

For example, the prior art discloses tongs whose main axis is connected to a cross whose ends are trapped by a circular member connected to the manipulator. The ends of the cross are formed by deformable balls which act as force-detectors. The force exerted on the tongs deforms the balls. From this, information regarding the force can be deduced. Such information is then used to modify the position of the manipulator. U.S. Pat. No. 3,921,445 (HILL et al.) discloses a gripper device of that kind. It comprises tongs whose jaws 29 and 30 are attached to the ends of parallel links 58 to 60. Two of the links are connected to toothed wheels 50 and 52 adapted to be driven in the two directions of rotation by a reversible motor 20.

The assembly formed by the jaws, links and toothed wheels 50, 52 is mounted on a support 22. A ring 18 is attached to the support 22 by screws 24. A number of resilient coupling members 26, attached on the one hand to the ring 18 and on the other to the support 10, attached to the manipulator 8, make a resilient connection between these two members. Means are provided for detecting the deformation of the resilient coupling means. For example, in one embodiment, such means are formed by four elements $25_1$ to $25_4$, in which light-transmitting holes are made. Certain of these holes comprise on the one hand a light source, and on the other light-detecting means. Spindles 84 connected to the support 10 transmit the relative movement of the member 10 in relation to the bush 18 to the elements 25. The amount of light passing through the passages is a function of the forces and torques exerted.

However, a measured-force gripper device of that kind has a number of disadvantages.

The centre of seizure—i.e., the point lying between the two jaws which is equidistant from the geometrical centre thereof, is a long way from the resilient coupling means. As a result, the coupling means are sensitive to the sum of the weights of the tongs and of the article handled, whereas it would be desirable for them to be sensitive only to the forces exerted on the article.

A second disadvantage is that the resilient coupling means deliver coupled items of information, so that the forces and torques exerted on the article along three orthogonal axes cannot be obtained directly without complex calculations. The tongs can be oriented in a large variety of positions, in dependence on the degrees of freedom which they comprise. The interpretation of the information delivered by the force-detecting device must at every moment take the orientation of the tongs into account, the result being a highly complex calculation.

A third disadvantage is that the coupling means form a rigid structure which does not allow the article handled to move, thus denying it some suppleness and some adaptability, so that the device allows only restricted applications.

Lastly, the information delivered by the coupling means is influenced by the clamping force of the tongs, since when the article is clamped, the torque exerted by the rod 32 and the pinion 34 is transmitted to the support 22. This torque is equilibrated by the resilient coupling means. It is therefore impossible to deduce directly an outside force exerted on the article without taking this clamping force into account, which is itself difficult to determine.

The invention relates to a measured-force gripper device which obviates these disadvantages and more precisely enables information to be delivered which allows the direct determination, without any complex treatment, of the intensity of the force exerted on the article in accordance with each degree of freedom. An article can be displaced in accordance with six degrees of freedom-three degrees of rotary freedom, and three degress of prismatic freedom. A degree of rotary freedom takes the form of a pivoting, while a degree of prismatic freedom takes the form of a translational movement. Hereinafter the expression "degree of freedom" will be taken to mean a translational or rotary movement.

SUMMARY OF THE INVENTION

Accordingly, it is an object of the present invention to provides a measured-force gripper device comprising two fingers which can be displaced to clamp an article to be handled, wherein each finger is formed by a support, a contact plate which contacts the article to be handled, an articulated structure, which has several degrees of freedom and is interposed between the contact plate and the support, and a displacement-measuring pickup associated with each of the degrees of freedom of each finger, the pickup delivering information related exclusively to the movements carried out in accordance with that degree of freedom.

The gripper device according to the invention therefore enables any operation, such as placing, insertion, extraction, etc., to be performed. It can be adapted to a manipulator with or without reversible transmission. The deformation information delivered is general and uncoupled. This means that the information delivered by each pickup associated with a degree of freedom are a function exclusively of the deformation in accordance with such degree of freedom of the articulated structure. Such information therefore requires no further treatment. Moreover, the force-measuring device is disposed as close as possible to the article handled, and this increases its sensitivity.

Although a gripper device comprising six degrees of freedom is desirable, so that the freedom and torques exerted on the article to be handled can be broken up into three orthogonal axes, in practice it is possible to make do with a smaller number of degrees of freedom. This allows a simpler construction which nevertheless operates satisfactorily and enables a large number of current operations to be performed.

The invention therefore provides a measured-force gripper device which comprises a main axis of symmetry and two fingers which move while remaining parallel with such main axis of symmetry. The plane defined by the axes of the two fingers is called the plane of symmetry of the tongs. The articulated structure comprises three degrees of freedom which are, starting from the contact plate: a rotation around the axis of each finger; a translational movement along an axis perpendicular to the plane of the tongs; a rotation around an axis lying in the plane of the tongs and perpendicular to the main axis thereof.

In another embodiment, the gripper device according to the invention comprises a fourth degree of freedom which is formed by a translational movement along an axis parallel with the main axis of the tongs and lying between the translational movement of axis perpendicular to the plane of the tongs and the rotation around the axis perpendicular to the main axis of the tongs.

In these two particular embodiments, the translational movement along the axis Y is coupled linearly with the angle $\Delta_Z$. To uncouple such translational movement, the quantity $(L) \times (\Delta)$ subtracted from the signal supplied by the pickup, L being the distance between the centre of seizure C and the axis lying in the plane of the tongs and perpendicular to its main axis (the centre of seizure is formed by the centre of the article to be handled).

Preferably the displacement-measuring pickups associated with each degree of freedom are formed by conductive rubbers which deliver information associated with their deformation.

Although preferably, two conductive rubbers are associated with each degree of freedom, the two rubbers being placed on either side in relation to the displacement of the degree of liberty and supplying a differential signal.

BRIEF DESCRIPTION OF THE DRAWINGS

Other features and advantages of the invention will be gathered from the following non-limitative exemplary description of an embodiment with reference to the accompanying drawings, wherein:

FIGS. 4 to 6 are respectively a perspective view and two sectional views of the embodiment comprising three degrees of freedom illustrated in FIG. 1.

DETAILED DESCRIPTION OF THE PREFERRED EMBODIMENTS

Figure 1:
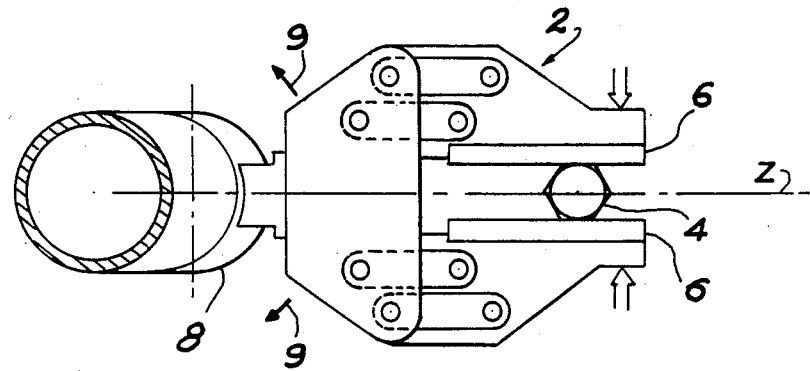
FIG. 1 is a view of a gripper member without force measurement.

FIG. 1 shows diagrammatically tongs with parallel jaws which clamps an article, in this case a screw 4, between the jaws 6. The tongs are disposed at the end of a manipulator 8 which enable them to be displaced in a certain number of directions, for example, rotatably in the direction indicated by arrows 9.

Figure 2:
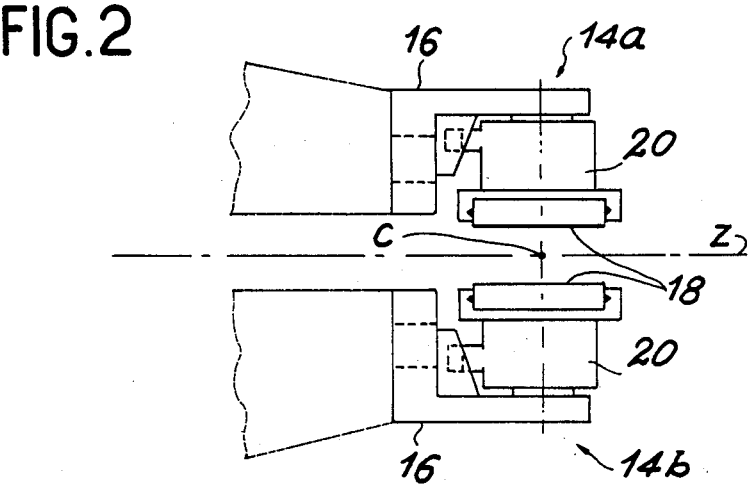
FIG. 2 is a diagrammatic view of a measured-force gripper member according to the invention.

However, the fact that the tongs 2 have no device for measuring the forces exerted on the screw 4 means that certain operations cannot be performed. The fact is that the precision with which the screw 4 can be handled is limited by the precision of the manipulator 8 and that of the tongs 2. This is why in order to perform an operation which requires the precise positioning of the screw 4 in relation to the screwthreading, the forces exerted on the screw must be measured in order to reposition the tongs in relation to such information. The gripper device according to the invention illustrated in FIG. 2 enables this result to be achieved. It is made up of two fingers 14a and 14b which can be displaced to clamp the article to be handled. Each finger is made up of a rigid support 16, which can be displaced by electric motors, and a contact plate 18 which contacts the article to be handled when the rigid supports 16 are brought together. Between the support 16 and the plate 18 of a finger is disposed an articulated structure 20 having several degrees of freedom. A displacement-measuring pickup is associated with each of these degrees of freedom. Each pickup delivers information which is associated exclusively with the movement of the articulated structure in accordance with this degree of freedom.

A degree of freedom can be performed either by translational movement which is performed by a slide, or else by a rotary movement. Whatever the case may be, the amplitude of the translational or rotary movement is limited to the greatest possible extent, so as to exert the least possible influence on the operation of the tongs.

The axis Z is the main axis of the tongs. The point C disposed on the axis Z denotes the centre of seizure. It lies between the two contact plates 18, at the level of the geometrical centre of each of them.

The articulated structure 20 can comprise up to six degrees of freedom-i.e., three degrees of rotary freedom and three degrees of translational freedom. The result is a complete breakdown of the forces and torques exerted on the article handled in accordance with three standardized right-angled axes. However, in practice for operations such as insertion, extraction, screwing, placing, it is unnecessary to measure such forces so completely. It is possible to make do with a smaller number of degrees of freedom, for example three. An embodiment of such a device is shown diagrammatically in perspective in FIG. 3. The detailed construction of the device is shown in FIGS. 4 to 6.

Figure 3:
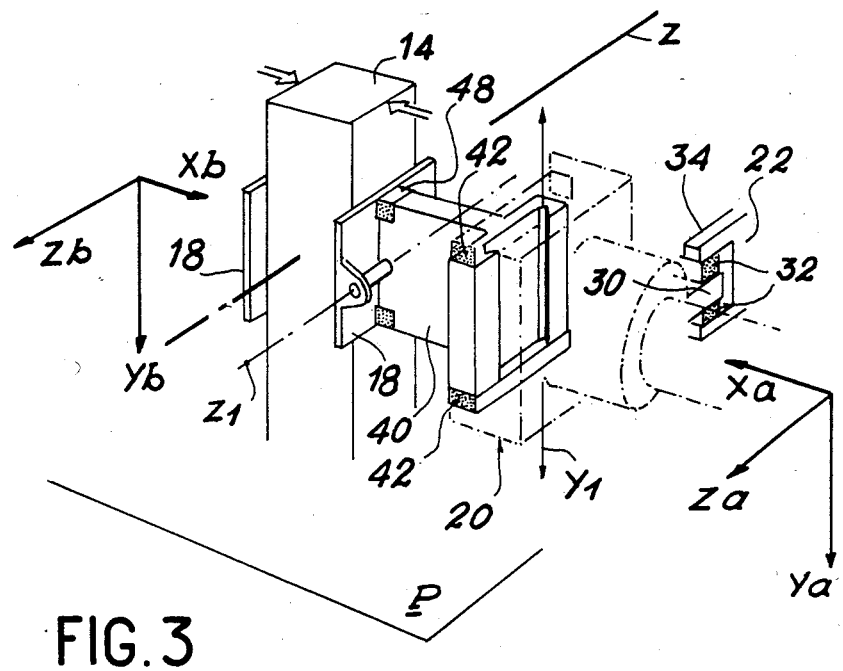
FIG. 3 is a perspective view of an embodiment of a measured-force gripper member comprising three degrees of freedom.

In FIG. 3 the reference Z denotes the main axis of the tongs. The tongs comprise two fingers which move while remaining parallel with the axis Z. Only one of the fingers will be described, it being understood that the two fingers are symmetrical, and that the following description applies to each of them.

For each finger a tri-rectangular trihedron XYZ. For the finger 14a, the tri-rectangular trihedron has the index a. Similarly, the finger 14b, the tri-rectangular trihedron has the index b. The axes Za and Zb are parallel with the axis Z. They determine the plane of the tongs P. The axes Xa and Xb lie in the plane of the tongs P and perpendicular to the axis Z. The axes Ya and Yb are perpendicular to the plane of the tongs P.

The article to be handled is disposed between the two fingers. It is clamped by two contact plates 18. The articulated structure 20 is interposed between the plate 18 and the rigid support (not shown) of axis Za. In the same way, the support of the second figure has an axis Zb.

The articulated structure 20 comprises three degrees of freedom. These are two rotations and one translational movement. The first rotation, starting from the contact plate 18, is a rotation around an axis $Z_1$ parallel with the axis Z.

The axes $Z_1$ and $Z_2$ (not shown) lie in the plane P when no force is exerted on the contact plates 18. When a force is exerted, the axes are displaced, and may remain in the plane or not, in dependence on the particular case. However, the deformations of the articulated structure remain slight in all cases and the axes $Z_1$ $Z_2$ remain broadly speaking parallel with the axis Z.

The second degree of freedom is a translational movement along an axis $Y_1$ perpendicular to the plane P when no force is applied to the contact plate 18. However, the remark made as regards the degree of rotary freedom around the axis $Z_1Z_2$ applies equally. Consequently, during the operation of the tongs, the axes $Y_1$ and $Y_2$ respectively remain substantially perpendicular to the plane P. The third degree of freedom is a rotation around the axis Xa and Xb respectively, lying in the plane of the tongs P and perpendicular to the axis Z. It must be noted that contrary to the two preceding degrees of freedom the axis around which this degree of freedom is performed is fixed, whatever the force exerted on the contact plates 18 may be, since the axis rotation is rigidly bound up with the fixed support.

Measuring pickups are associated with each degree of freedom. In the embodiment described the pickups are conductive rubbers disposed on either side of the displacement of the degree of freedom.

FIG. 4 is a perspective view of one of the two fingers used in the gripper device according to the invention.

The finger is formed by a rigid support 22 which comprises a fixing orifice 23 via which the support 22 is attached to the end of the manipulator. The manipulator (not shown) communicates the displacement of the support 22 parallel with the axis Z, which enables the article to be handled to be clamped. Once the article has been clamped between the two plates 18 (cf. FIG.3) the required operations can be performed.

The articulated structure 20 comprising three degrees of freedom is formed by a bearing 24 mounted to pivot around a pivot 26 connected to the rigid support 22, as shown in FIG. 5. The bearing can be a bearing of any desired type. In the embodiment disclosed it is a bearing formed by two inclined elements 28. A flat finger 30 is attached to the outside of the bearing 24. Two rubbers 32 are disposed on either side of the finger 30 inside a fork formed by two walls 34 connected to the rigid support 22. The two rubbers thus limit the rotation of the bearing 24 around the axis X. When a torque is exerted on the bearing 24, it is transmitted via the finger 30 to the rubbers 32. One of the rubbers is compressed while the other is expanded. Each rubber provides information associated with its deformation. The result is two items of information which enable the force exerted on the rubbers 32, and therefore the torque exerted on the bearing 24 to be deduced. A pickup which is suitable for this use as disclosed in French Pat. No. 2 330 996, filed on Nov. 5, 1975 for "tactile pickup". The rotation of the bearing 24 is a function of the torque exerted on the article handled along the axis X. However, in any case it is limited to 10°.

A rectangular flange 36 is connected to the bearing 24. Two vertical slides 38, for example ball slides, are devised on the flange 36. The slides 38 allow the vertical displacement of a mobile table 40 in relation to the flange 36. This produces the prismatic degree of freedom in the vertical axis Y. Two pickup rubbers 42 are disposed above and below the mobile table 40. The rubbers are jammed between the mobile table and two wings 44 of the flange 36. The travel of the table 4 is short, for example, limited to 3 mm. The two rubbers 42 deliver a differential signal which is associated with the displacement of the mobile table 40 and therefore with the force exerted along a vertical axis of the mobile table. From this, therefore, the vertical component of the force exerted on the article to be handled is deduced. However, as will be seen hereinafter, the uncoupling of this translational movement is not perfect. However, it is easy to remedy this disadvantage.

The device comprises a third degree of freedom, namely a rotation around the axis $Z_1$. The rotation is performed by two half-spindles 46 which enable the contact plate 18 to pivot in relation to the mobile table 40. Two pickup rubbers 48 are disposed between the mobile table 40 and the plate 18 above and below the axis $Z_1$. Only the lower rubber 48 is shown in FIG. 4. When the plate 18 pivots around the axis $Z_1$, the two rubbers are oppositely deformed. One is compressed, the other expanded. As in the case of preceding degrees of freedom, the two rubbers 48 deliver a differential signal directly associated with the rotation of the contact plate 18 around the axis $Z_1$.

It must be noted that in the embodiment just described, there is a coupling of the translational movement along the vertical axis Y, given by the two slides 38, with the angle of rotation of the contact plate 18 around the axis $Z_1$. This means that a rotation of the plate 18 around the axis $Z_1$ results in the displacement of the mobile table 40 in relation to the flange 36, since during such rotation the centre of seizure of the article C—i.e., the centre of the article handled—remains fixed, since it is a rotation pure and simple. The rotation of the mobile plate therefore causes an offsetting of the mobile table 40 in relation to the flange 36, such offsetting being a function of the angle of rotation of the plate 18, and also of the distance between the centre of seizure C and the axis $Z_1$. More precisely, if we apply the term to the rotation of the contact plate 18 around the axis $Z_1$, we have $$\text{tangent } \Delta = \frac{\Delta Y}{L}$$

where L is the distance between the centre of seizure and the axis $Z_1$. However since $\Delta$ is low (less than 10°), $\Delta Y$ is equal to $(L) \times (\Delta)$.

The translational movement along Y can therefore easily be uncoupled. For that purpose it is enough to subtract a quantity L. from the signal delivered by the pickups 42. Such subtraction can be performed very simply by an electronic device which is easy to construct and will therefore not be described.

Figure 7:
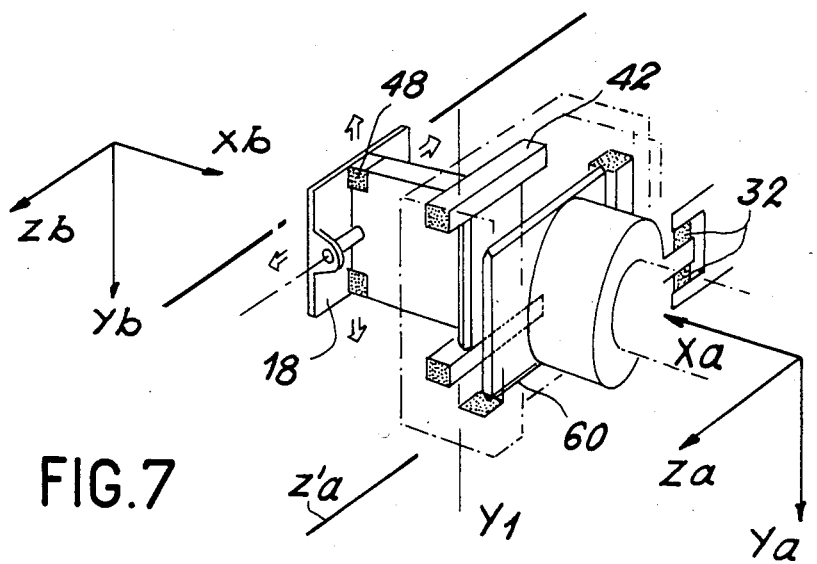
FIG. 7 is a diagrammatic view of a variant embodiment comprising a fourth degree of freedom.

FIG. 7 shows another embodiment of the invention which comprises one degree of freedom more than the embodiment illustrated in FIGS. 3 to 6. This extra degree of freedom is a translational movement along an axis Z'a parallel with the main axis of the tongs. It is performed by two horizontal slides 60 shown diagrammatically in FIG. 7.

These horizontal slides are disposed between the rotation around the axis X and the translational movement along the axis Y. What has been said about the translational movement along the axis Y applies to the translational movement along the axis Z. More particularly, the travel is less than 3 mm. Two conductive rubbers disposed on either side of the mobile table deliver a differential signal associated with the displacement of the table and therefore with the force exerted on the article to be handled in the direction of the axis Z.

What is claimed is:

1. A measured-force gripper device to be attached to the end of a manipulator arm, comprising;
   two fingers, each being formed by a support;
   a spindle connected to an end portion of the support and having a geometrical axis perpendicular to said end portion;
   a bearing mounted to pivot on the spindle;
   a flange connected to the bearing;
   a table which can make a translational movement in relation to the flange and a contact plate which is adapted to contact an article to be handled and pivotedly fitted about an axis perpendicular to the geometrical axis of the spindle in relation to said mobile table;
   a first displacement-measuring pickup being interposed between said support and said bearing to deliver an information related to the rotational movement of said bearing about the spindle axis;
   a second displacement-measuring pickup being interposed between said flange and said mobile table to deliver an information related to the translational movement of said table; and
   a third displacement-measuring pickup being interposed between said table and said contact-plate to deliver an information related to the rotational movement of said contact plate about its axis.

2. A gripper device according to claim 1, wherein the pickups interposed between said support and said bearing, said flange and said mobile table, said table and said contact plate respectively are formed by conductive rubbers which deliver informations associated with their deformation.

3. A gripper device according to claim 2, wherein two pickup rubbers are interposed between said support and said bearing, said flange and said movable table, said table and said contact plate respectively, the two rubbers being opposed in relation to the displacement of said bearings, said mobile table and said contact plate respectively, and supplying a differential signal.

4. A gripper device according to claim 1, also comprising a fourth degree of freedom, such degree of freedom being formed by a translational movement parallel to the contact plate, and lying between the translation of said table and the rotation around the spindle axis, wherein the fourth degree of freedom is provided by means of two slides having axes perpendicular to the spindle axis and disposed between the mobile table and the flange, a fourth displacement measuring pickup being interposed between said two slides to deliver an information related to the displacement of one slide with respect to the other.

5. A gripper device according to any one of claims 3 or 4, wherein said two second displacement measuring pickups are disposed on either side of the mobile table.

6. A gripper device according to claim 4, wherein two rubbers are interposed between said two slides to deliver an information related to the translational movement of said slides one with respect to the other, said two rubbers being disposed on either side of said slides.

7. A gripper device according to claim 3, wherein a flat finger is attached to the bearing performing the rotation around the axis lying in the plane P and perpendicular to the main axis Z of the grippers, said two first displacement measuring pickups being disposed on either side of said finger.

8. A gripper device according to claim 1, comprising a main axis of symmetry Z, each finger having a geometrical axis Za, Zb, wherein said fingers are displaced while remaining parallel with the axis Z, with the plane defined by the parallel axis Za, Zb being called the plane of the gripper P.

* * * * *